United States Patent
Mukaijima et al.

(10) Patent No.: US 6,816,337 B1
(45) Date of Patent: Nov. 9, 2004

(54) MAGNETIC RECORDING DEVICE HAVING A PARTICULAR FRAME PLATE CONFIGURATION

(75) Inventors: Katsutoshi Mukaijima, Tokyo (JP); Maki Wakita, Saitama (JP); Shoji Takahashi, Saitama (JP)

(73) Assignees: Iomega Corporation, San Diego, CA (US); Citizen's Watch Co., Ltd., Tokyo (JP)

( * ) Notice: Subject to any disclaimer, the term of this patent is extended or adjusted under 35 U.S.C. 154(b) by 0 days.

(21) Appl. No.: 09/424,180

(22) PCT Filed: Mar. 19, 1999

(86) PCT No.: PCT/JP99/01413

§ 371 (c)(1),
(2), (4) Date: Feb. 10, 2000

(87) PCT Pub. No.: WO99/49465

PCT Pub. Date: Sep. 30, 1999

(30) Foreign Application Priority Data

Mar. 20, 1998 (JP) .......................................... 10-071590

(51) Int. Cl.[7] .............................................. G11B 19/20
(52) U.S. Cl. ................................. 360/97.01; 360/99.08
(58) Field of Search ........................... 360/97.01, 97.02, 360/99.01, 99.04, 99.08, 264.1

(56) References Cited

U.S. PATENT DOCUMENTS

| | | | | |
|---|---|---|---|---|
| 5,109,310 A | * | 4/1992 | Ohkjita et al. ........... | 360/264.3 |
| 5,270,887 A | * | 12/1993 | Edwards et al. ......... | 360/97.03 |
| 5,329,412 A | * | 7/1994 | Stefansky ................ | 360/97.01 |
| 5,532,889 A | * | 7/1996 | Stefansky et al. ....... | 360/97.01 |
| 5,537,270 A | * | 7/1996 | Morehouse et al. ..... | 360/97.02 |
| 5,596,461 A | * | 1/1997 | Stefansky ................ | 360/97.01 |
| 5,602,697 A | * | 2/1997 | Jeong et al. ............. | 360/97.02 |
| 5,809,520 A | | 9/1998 | Edwards et al. ............ | 711/115 |
| 5,870,248 A | * | 2/1999 | Akutsu et al. ........... | 360/99.04 |
| 6,011,670 A | * | 1/2000 | Balsley et al. ........... | 360/97.01 |
| 6,034,841 A | * | 3/2000 | Albrecht et al. ......... | 360/97.01 |
| 6,278,574 B1 | * | 8/2001 | Wakita et al. ........... | 360/99.01 |
| 6,389,869 B1 | * | 5/2002 | Wakita et al. ............. | 72/379.2 |

FOREIGN PATENT DOCUMENTS

| EP | 0 788 103 A2 | 8/1997 |
|---|---|---|
| JP | 7-105673 | 4/1995 |
| JP | 9-270161 | 10/1997 |

* cited by examiner

Primary Examiner—Brian E. Miller
(74) Attorney, Agent, or Firm—Woodcock Washburn LLP

(57) ABSTRACT

The magnetic recording unit is enclosed with a case body (15, 16). A cartridge insertion slot (18) for inserting a cartridge housing a disk, which is a recording medium, is formed at the rear end of the case body (15, 16), and a frame plate (19) is disposed inside the case body. A first concave section and a second concave section are formed on this frame plate (19) by drawing processing, a disk drive motor (5) is mounted using the first concave section, and a head drive motor (16) for driving the record/playback head body (17) for the disk is mounted using the second concave section.

14 Claims, 11 Drawing Sheets

MAGNETIC RECORDING DEVICE HAVING A PARTICULAR FRAME PLATE CONFIGURATION

BACKGROUND OF THE INVENTION

1. Field of the Invention

The present invention relates to an improvement of a magnetic recording unit which is set to such information equipment as a portable personal computer for recording information or inputting recorded information into the information equipment for playback.

2. Description of the Related Art

It is known that a credit card sized card type magnetic recording unit, such as a PC card, is inserted into a slot of such information equipment as a portable computer so as to exchange data between the information equipment and the card type magnetic recording unit. Another card type magnetic recording unit available can set or eject a cartridge where a disk, which is a recording medium, is housed inside, and includes a unit for driving a disk and a record/playback head drive unit.

Information equipment, such as a portable computer, on the other hand, is becoming compact and slim, and as a result, the slot of the information equipment for setting the PC card conforms to PCMCIA (Personal Computer Memory Card International Association) standard type II. A card type information equipment, such as a PC card, to be inserted in this slot is strictly specified to be a case width of 54.0 mm, length 85.60 mm and thickness 5.00 mm.

Therefore a critical issue here is how to house a unit for driving a disk and drive unit for the record/playback head at optimum locations in such a shallow and small space, without being deformed easily by external force.

SUMMARY OF THE INVENTION

It is an object of the present invention to provide a thin and strong magnetic recording unit which can be used for such portable information equipment as a compact and slim computer.

To achieve the above object, a magnetic recording unit in accordance with the present invention comprises: a case body where a cartridge insertion slot for inserting a cartridge housing a disk, which is a recording medium, is formed on one end; a frame plate mounted inside the case body where a first concave section and a second concave section are formed at different areas; a disk drive motor which is mounted on the frame plate using the first concave section so as to drive and rotate the disk; and a record/playback head body for recording and playing back information to/from the disk and a head drive motor for driving the record/playback head body for the disk, which are mounted on the frame plate using the second concave section.

Preferably, slots are formed on the base of the first concave section at a location facing stator coils of the disk drive motor, so that the stator coils do not contact the base of the first concave section. Also, a plurality of openings are formed on the wall surrounding the first concave section so that these openings absorb stress when the first concave section is formed on the frame plate by drawing processing.

DESCRIPTION OF THE PREFERRED EMBODIMENTS

A first embodiment of the magnetic recording unit in accordance with the present invention will be explained with reference to FIG. 1 to FIG. 8.

Figure 1:
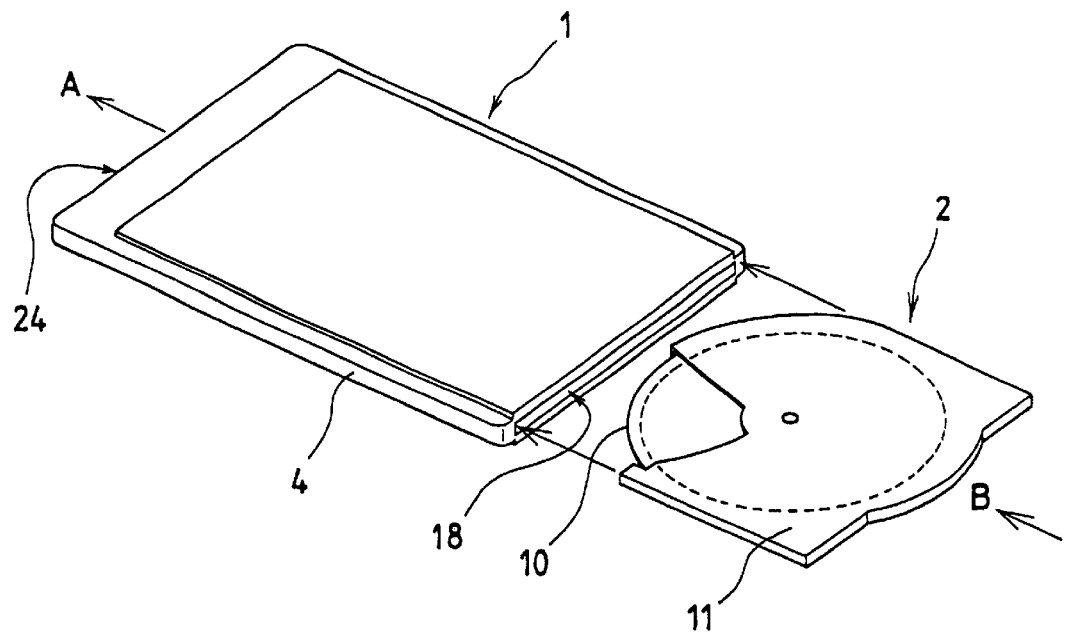
FIG. 1 is a perspective view viewed diagonally from the top depicting a magnetic recording unit and a cartridge of a first embodiment in accordance with the present invention.

At first, an overview of the magnetic recording unit 1 and cartridge 2, which is set to the magnetic recording unit 1 or ejected thereof, will be explained with reference to FIG. 1.

At the front of the magnetic recording unit 1, a connector 24 is disposed, and at the back, a cartridge insertion slot 18 to load the cartridge 2 is disposed.

The cartridge 2 has a disk case 11 where a disk 10, which is a magnetic medium, is housed. The disk 10 is rotatably supported by the disk case 11. The cartridge 2 is inserted through the cartridge insertion slot 18 of the magnetic recording unit 1 in the arrow B direction so as to be loaded in the magnetic recording unit 1.

The magnetic recording unit 1 is set in the computer main body (not illustrated) by shifting the connector 24 in the arrow A direction toward the slot of the computer main body.

Figure 2:
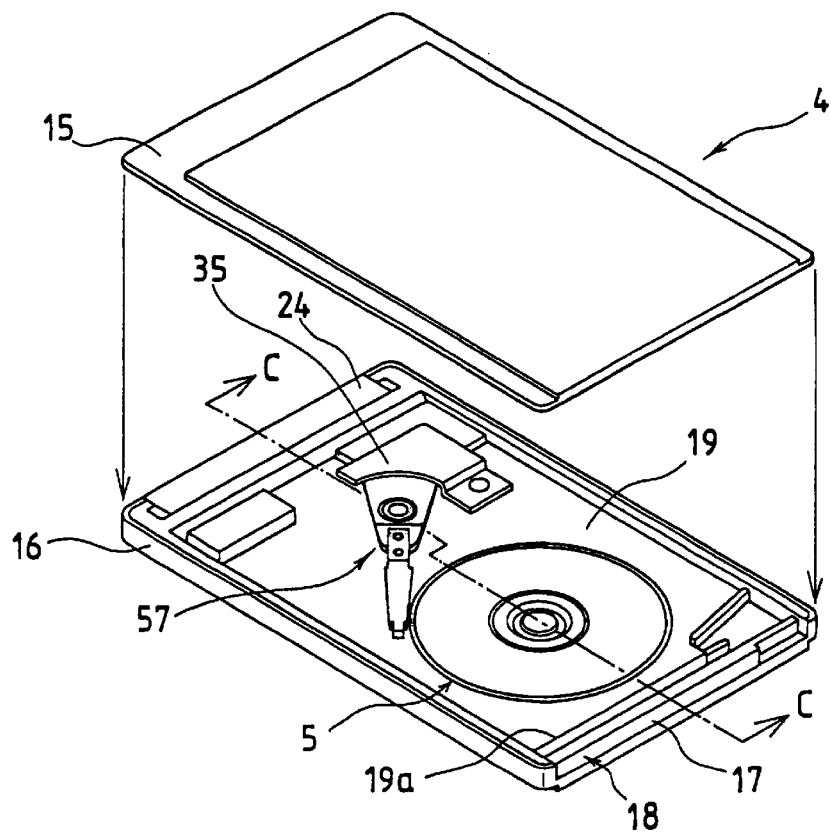
FIG. 2 is an explanatory drawing depicting a state where the top cover of the magnetic recording unit in FIG. 1 is removed.
Figure 3:
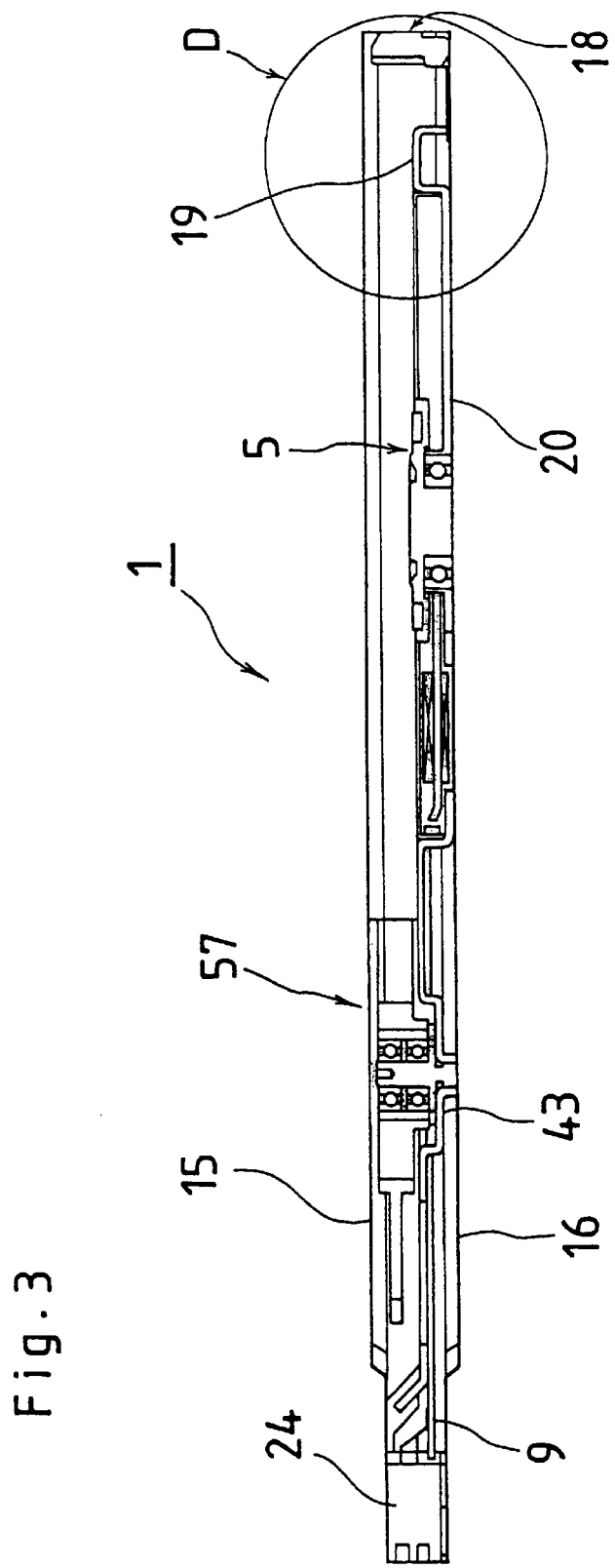
FIG. 3 is a cross-sectional view depicting the C—C cross-section in FIG. 2 (the top cover is removed)

Next an overview of the magnetic recording unit 1 will be explained with reference to FIG. 2 and FIG. 3.

The magnetic recording unit 1 has a case body 4 which external dimensions conform to the PCMCIA standard type II. The case body 4 comprises a top cover 15 and a bottom cover 16. In the case body 4, a frame plate 19 is disposed. The frame plate 19 is made of non-magnetic material, for example, stainless steel with non-magnetic properties.

On the top face side of the frame plate 19, a disk drive motor 5 and a record/playback head body 57 are mounted. The record/playback head body 57 is mounted close to the connector 24, as shown in FIG. 2. The disk drive motor 5 is disposed at a position slightly behind the mounting position of the record/playback head body 57 (that is, at the side of the cartridge insertion port).

Figure 11:
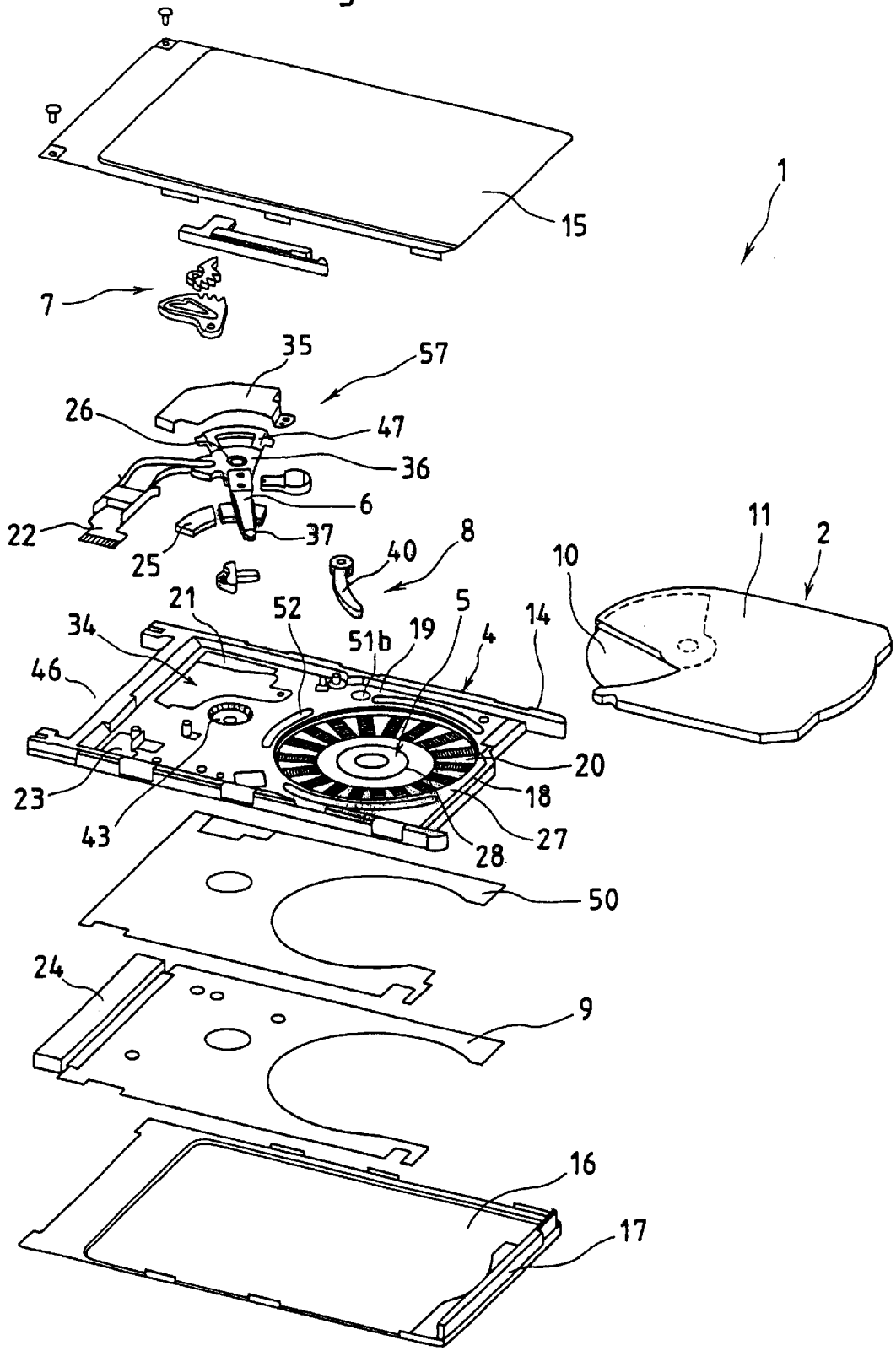
FIG. 11 is an exploded perspective view of the magnetic recording unit of the second embodiment in accordance with the present invention.

On the bottom face side of the frame plate 19, on the other hand, a circuit board 9 is mounted via an insulation sheet 50 (see FIG. 11). This circuit board 9 is connected to the computer via the connector 24 mounted at the front end of the frame plate 19.

In this way, a mechanism part (disk drive motor 5, record/playback head body 57 and the like) and a circuit part (circuit board 9) are separated by the frame plate 19, which makes the assembly of parts easier.

Figure 4:
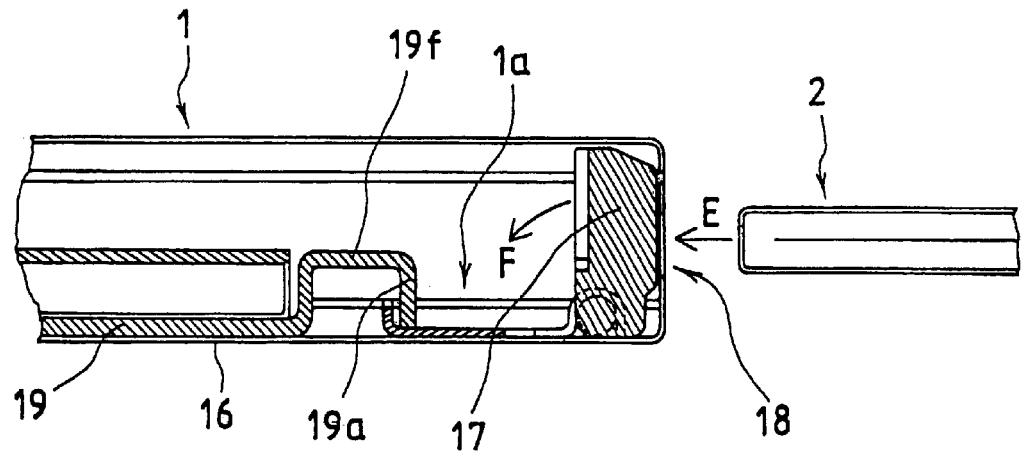
FIG. 4 is a partially enlarged sectional view where the D portion in FIG. 3 is enlarged.
Figure 5:
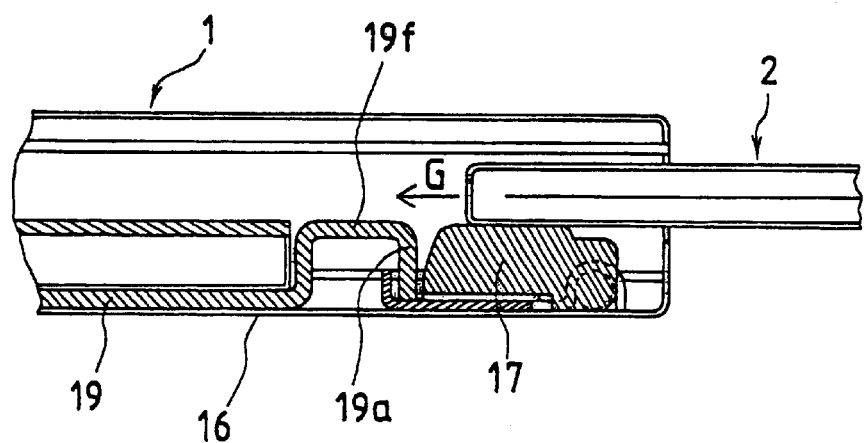
FIG. 5 is an explanatory drawing depicting a state where the cartridge is set in the magnetic recording unit shown in FIG. 4.

Now details on the structure around the cartridge insertion port 18 of the magnetic recording unit 1 will be described with reference to FIG. 4 and FIG. 5.

At the rear end of the bottom cover 16 constituting the case body 4, a bottom end of a lid body 17 having a height and width corresponding to the height and width of the cartridge insertion port 18 is mounted. This lid body 17 is constantly maintained in a state of closing the cartridge insertion port 18 by a force exerted by a spring (not illustrated).

When the lid body 17 closes the cartridge insertion slot 18, the top end of the lid body 17 comes very close to the top edge of the cartridge insertion slot 18, while the bottom end of the lid body 17 comes very close to the bottom edge of the cartridge insertion slot 18. Therefore, when a bending force in the width direction is exerted on the magnetic recording unit 1, the lid body 17 supports the top edge and bottom edge of the cartridge insertion slot 18, preventing the magnetic recording unit 1 from bending.

The rear end of the frame plate 19 is bent vertically downward, forming a frame plate bent section 19a. This frame plate bent section 19a is formed to be long in the width direction, as shown in FIG. 2, which reinforces the rigidity of the frame plate 19 against bending in the width direction.

Between the cartridge insertion slot 18 and the frame plate bent section 19a, the frame plate 19 is not present, instead the lid body housing section 1a is formed. If the lid body 17 in the upright position closing the cartridge insertion slot 18 is pushed down by movement in the arrow E direction in FIG. 4 of the cartridge 2 (that is, rotated about 90 degrees in the arrow F direction), as shown in FIG. 2, the lid body 17 is housed in the lid body housing section 1a, as shown in FIG. 5.

The thickness of the lid body 17 is determined such that the top face of the lid body 17 and the top face of the frame plate 19 come to substantially on the same plane when the lid body 17 is pushed down and housed in the lid body housing section 1a.

A cartridge guiding section 19f is formed in the frame plate 19 at a portion leading to the frame plate bent section 19a. When the cartridge 2 at the location shown in FIG. 5 is inserted more forward (that is, in the arrow G direction in FIG. 5), the cartridge 2 is guided by the cartridge guiding section 19f, moving thereon, and is set at a predetermined position of the magnetic recording unit 1.

As mentioned above, when the cartridge 2 is not loaded, the lid body 17 closes the cartridge insertion slot 18 by the force exerted by the spring. If the cartridge 2 is inserted through the cartridge insertion slot 18, the lid body 17 is opened by the movement of the cartridge 2, which makes the loading operation of the cartridge 2 easy.

Next the configuration for mounting the disk drive motor 5 on the frame plate 19 will be explained with reference to FIG. 6. A first mounting concave section 20, having a shallow cup shape with a circular cross-section, is formed on the frame plate 19 by drawing processing. At the center of the first mounting concave section 20, a disk drive motor mounting section 19c is formed by the drawing processing in the opposite direction from the drawing direction of the first mounting concave section 20.

The disk drive motor mounting section 19c is comprised of a bent section (vertical wall) surrounding the center opening 39 of the first mounting concave section 20, and a rotor shaft 30 is mounted inside the disk drive motor mounting section 19c via a motor bearing 38.

In this way, since the frame plate 19 has a plurality of concave sections (first mounting concave section 20 and disk drive motor mounting section 19c) on a flat plate, it has a high rigidity against bending by an external force.

A mounting base 31 for mounting the disk 10 is formed at the top end of the rotor shaft 30. A rotor 28 and a disk attraction magnet 32 are secured on the mounting base 31.

The rotor 28 has a shallow cup shape with a circular cross-section. The top face of the rotor 28, which corresponds to the base of the cup, is formed so as to lie substantially on the same plane as the top face of the frame plate 19. On the inner face of the wall 28c surrounding the rotor 28, which corresponds to the side wall of the cup, a plurality of rotor magnets 33 are secured at equal spacing in the circumference direction.

Figure 6:
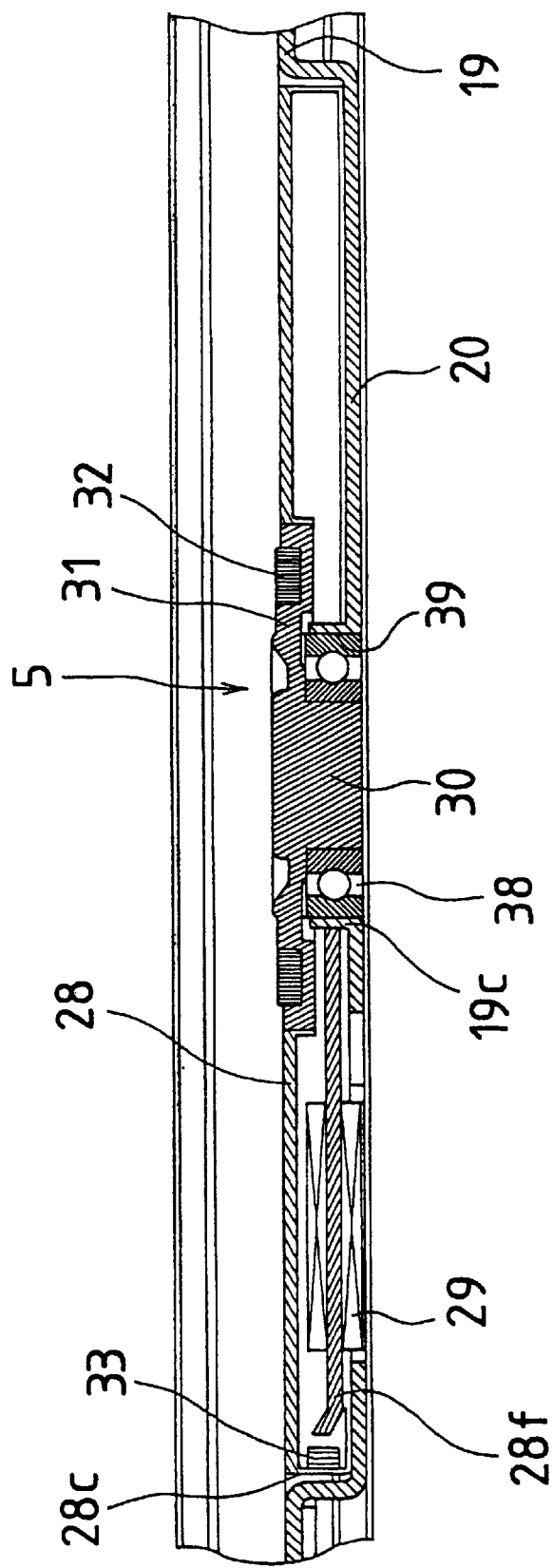
FIG. 6 is a partially enlarged sectional view where the disk drive motor shown in FIG. 3 is enlarged.

The cup of the rotor 28 is disposed bottom upward in the first mounting concave section 20, as shown in FIG. 6, therefore the wall 28c surrounding the rotor 28 can secure sufficient height for disposing the rotor magnets 33.

The top face of the rotor 28 is formed substantially on the same plane as the top face of the frame plate 19, and the top face of the disk attraction magnet 32 is formed slightly higher than the top face of the rotor 28.

A yoke element 28f having a plurality of arms, which are arranged radially, is inter-fitted in the disk drive motor mounting section 19c. This yoke element 28f is made of magnetic material and is secured at the first mounting concave section 20. A stator coil 29 is coiled on each arm. The tips of the arms where the stator coil 29 is coiled closely face the rotor magnets 33 secured on the rotor magnet surrounding wall 28c of the rotor 28.

The stator coil 29 is connected to the control circuit (not illustrated) formed on the circuit board 9 disposed at the bottom face side of the frame plate 19, and is driven by the control circuit to rotate the rotor 28.

The disk drive motor 5 is comprised of the rotor 28, where the rotor magnets 33 are secured, and the yoke element 28f, where the stator coils 29 are coiled on the arms, as explained above.

Figure 7:
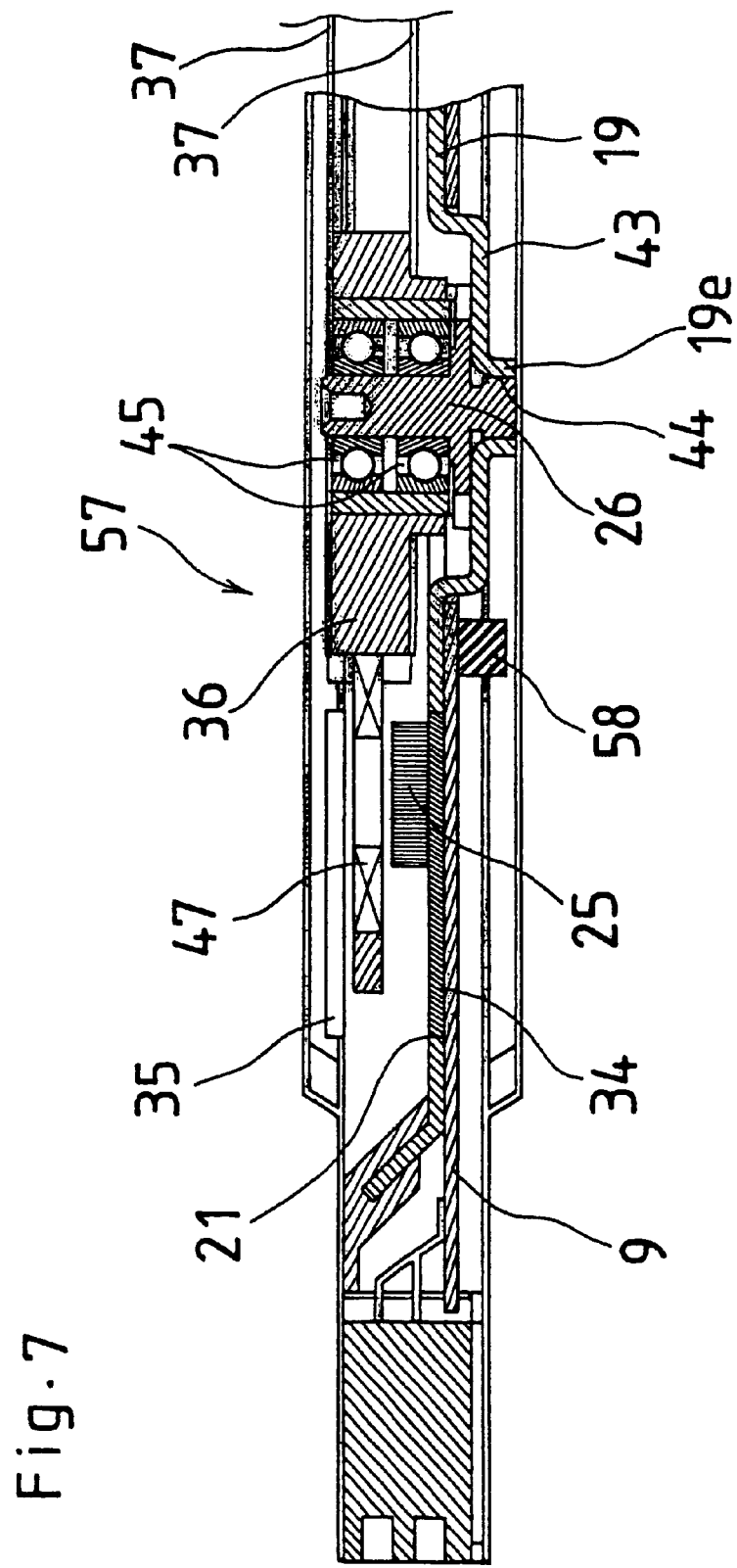
FIG. 7 is a partially enlarged sectional view where the record/playback head body shown in FIG. 3 is enlarged.

Now the configuration for mounting the record/playback head body 57 and the head drive motor for driving the record/playback head body 57 on the frame plate 19 will be explained with reference to FIG. 7.

The second mounting concave section 43 having a shallow cup shape with a circular cross-section is formed on the frame plate 19 by drawing processing. The head drive motor mounting section 19e is formed around the opening 44 at the center of the second mounting concave section 43 by drawing processing in the same direction as the drawing direction of the second mounting concave section 43. Since the second mounting concave section 43 can be formed by the shallow drawing process in the above configuration, processing is easy.

The head drive motor mounting section 19e is comprised of a bent section (vertical wall) formed around the opening 44 at the center of the second mounting concave section 43, and the head shaft 26 is inter-fitted inside the head drive motor mounting section 19e. Two head bearings 45 are inter-fitted on the head shaft 26. A head substrate 36, which is the substrate of the record/playback head body 57, is secured outside the two head bearings 45.

A head arm 37 and a head moving coil 47 are secured on the head substrate 36. The head arm 37 is formed as a long arm shape made of a thin plate, and the record/playback head (not illustrated) is mounted at the tip. This record/playback head faces the recording face of the disk 10 housed in the cartridge 2.

A roughly arc shaped opening (notched window section) 21 is formed in the frame plate 19 at an area facing the head moving coil 47. The center of the arc of the opening 21 is in accord with the center of the head shaft 26. The bottom yoke 34 is inter-fitted in this opening 21. This bottom yoke 34 is made of magnetic material, the shape is the same as the shape (arc) of the opening 21, and the thickness is the same as the thickness of the frame plate 19. Therefore the thickness of the magnetic recording unit 1 can be decreased by the thickness of the bottom yoke 34, compared with the case when the bottom yoke 34 is secured on the top of the frame plate 19.

The head drive magnet 25 is secured on the bottom yoke 34 closely facing the bottom face of the head moving coil 47. The top yoke 35 is mounted on the frame plate 19 closely facing the top face of the head moving coil 47 (see FIG. 2). This top yoke 35 and the bottom yoke 34 jointly create a magnetic field at the position of the head moving coil 47.

The head moving coil 47 is connected to the control circuit (not illustrated) which is provided on the circuit board 9 at the bottom face side of the frame plate 19, and current is supplied to the head moving coil 47 by this control circuit.

The head drive motor is comprised of the top yoke 35, the bottom yoke 34, the head drive magnet 17h, and the head moving coil 47, as explained above.

And as explained above, the top yoke 35, the bottom yoke 34 and the head drive magnet 25 generate a magnetic field at the position of the head moving coil 47, which generates the driving force in the head moving coil 47. By this driving force, the record/playback head (not illustrated) mounted on the head arm 37 can move roughly in a radial direction on the recording face of the disk 10, and can record/playback information to/from the disk 10.

Now the arrangement in the magnetic recording unit 1, from the frame plate 19 to the bottom cover 16, and respective examples of dimensions will be explained with reference to FIG. 8.

The insulation sheet 50 for electrically insulating the circuit board 9 and the frame plate 19 from each other is disposed between the circuit board 9 and the frame plate 19. A general purpose IC 58 is secured on the bottom face of the circuit board 9. The thickness of the frame plate 19 is 0.3 to 0.4 mm, the thickness of the insulation sheet 50 is 0.15 mm, the thickness of the circuit board 9 is 0.3 to 0.4 mm. and the thickness of the bottom cover 16 is 0.15 mm.

Figure 8:
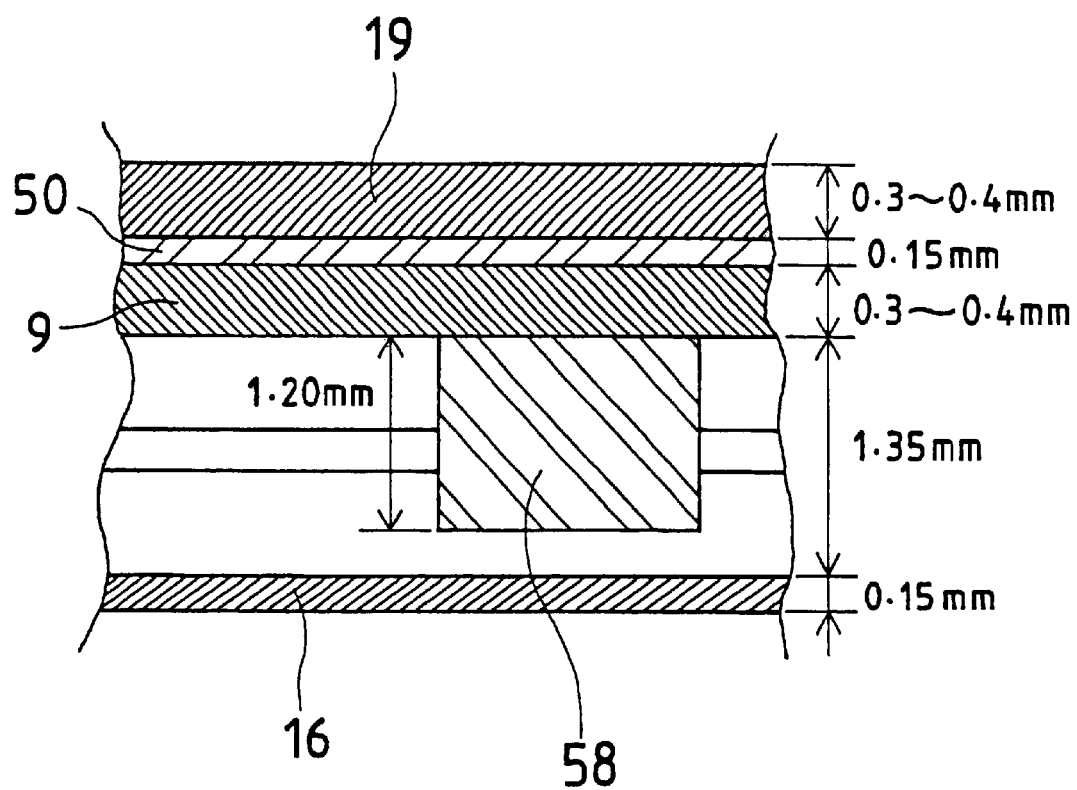
FIG. 8 is a partially enlarged sectional view depicting a state where the H portion in FIG. 7 is enlarged.

The circuit board 9 is disposed at the bottom face side of the flat area of the frame plate 19 excluding the first mounting concave section 20 (FIG. 6) and the second mounting concave section 43 (FIG. 7), therefore the space between the circuit board 9 and the bottom cover 16 can be 1.35 mm, as shown in FIG. 8. As a consequence, a general purpose IC 58, which maximum height is 1.20 mm, can easily be used, as shown in FIG. 8, which makes it unnecessary to develop a special IC, decreasing cost considerably.

Now a second embodiment of the magnetic recording unit in accordance with the present invention will be explained with reference to FIG. 9 to FIG. 13.

The basic configuration of the magnetic recording unit of the second embodiment is generally the same as the basic configuration of the above mentioned magnetic recording unit of the first embodiment, but the structure of the disk drive motor to be mounted on the frame plate is different from that of the magnetic recording unit of the first embodiment.

Figure 9:
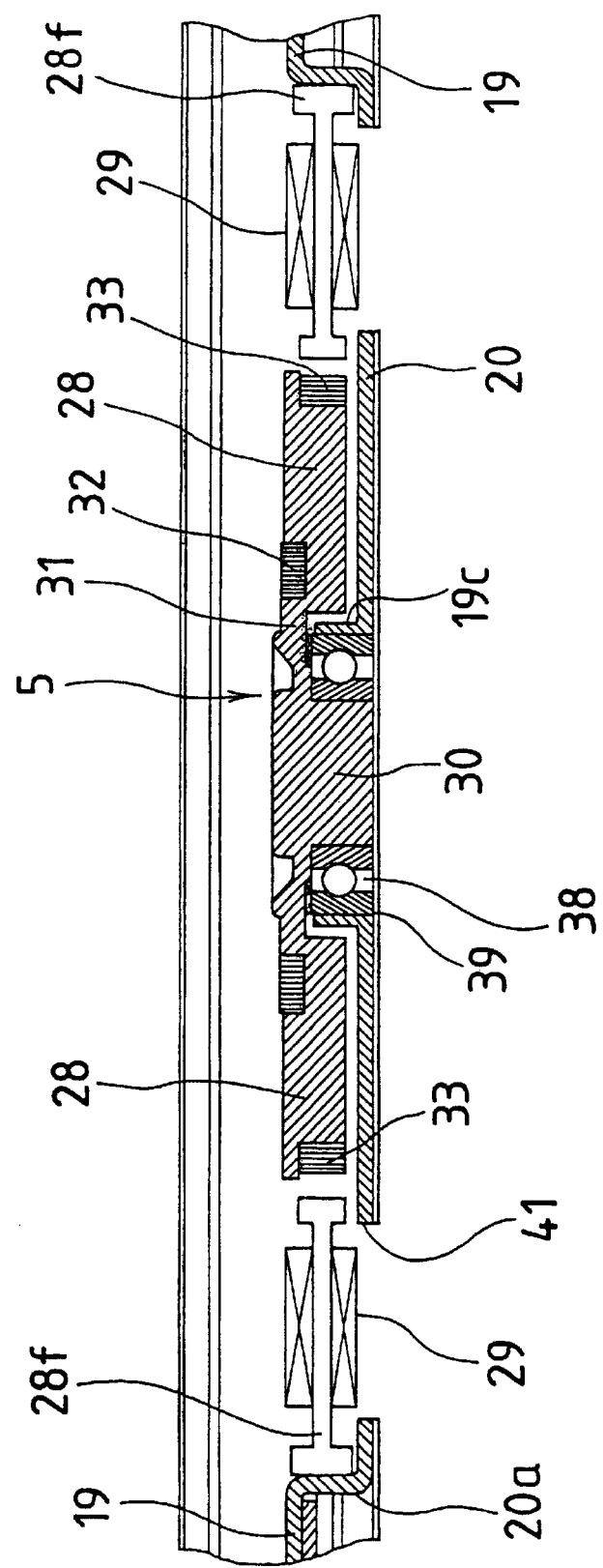
FIG. 9 is a partially enlarged sectional view where the disk drive motor in the magnetic recording unit of the second embodiment in accordance with the present invention is enlarged.

So the configuration for mounting the disk drive motor 5 on the frame plate 19 will be explained first with reference to FIG. 9.

On the frame plate 19, the first mounting concave section 20, having a cup shape with a circular cross-section, is formed by drawing processing. Around the center opening 39 at the center of the first mounting concave section 20, the disk drive motor mounting section 19c is formed by the drawing processing in the opposite direction from the drawing direction of the first mounting concave section 20.

The disk drive motor mounting section 19c is comprised of a vertical wall surrounding the center opening 39, and a rotor shaft 30 is mounted inside the disk drive motor mounting section 19c via a motor bearing 38.

A mounting base 31 for mounting the disk is formed at the top end of the rotor shaft 30. On the mounting base 31, the rotor 28 and the disk attraction magnet 32 are secured.

The yoke element 28f constituting a stator of the disk drive motor 5 comprises a circular part which outer diameter is roughly the same as the diameter of the cross-sectional circle of the first mounting concave section 20, and a plurality of arms (e.g. 18 arms) which are arranged radially from the inner face of the circular part toward the center (that is, toward the rotor shaft 30). The stator coil 29 is coiled on each arm.

The stator of the disk drive motor 5 is secured to the frame plate by securing the circular part of the yoke element 28f to the outer surrounding wall 20a of the first mounting concave section 20 with adhesive. The tips of the arms where the stator coil 29 is coiled closely face the rotor magnets 33 secured on the tip of the rotor 28.

The stator coil 29 is connected to the control circuit (not illustrated) formed on the circuit board 9 at the bottom face side of the frame plate 19, and is driven by the control circuit to rotate the rotor 28.

Figure 10:
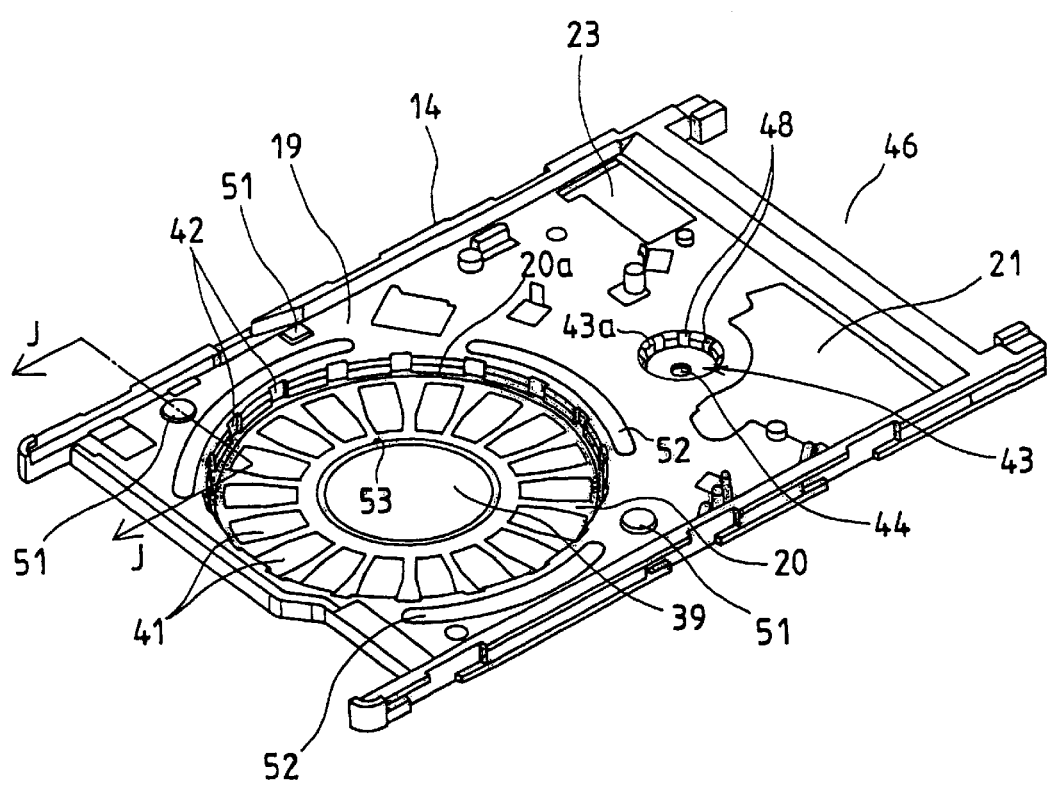
FIG. 10 is a perspective view of a frame plate of the magnetic recording unit of the second embodiment in accordance with the present invention.

As FIG. 10 shows, a plurality of slots 41 are formed on the base of the first mounting concave section 20 outside the disk drive motor mounting section 19c to spread radially from the center opening 39 at equal intervals. The positions of these slots 41 correspond to the positions of the stator coils 29 coiled on the arms of the yoke element 28f.

Therefore each stator coil 29 fits inside a slot 41 and does not stick out from the base of the first mounting concave section 20. As a result, the thickness of the case body can be thin.

On the surrounding wall 20a of the first mounting concave section 20 as well, openings 42, which are the same number of slots 41 formed on the base of the first mounting concave section 20, are formed at equal intervals all around, as shown in FIG. 10. These openings 42 are, however, formed at positions shifted a half pitch from the positions of the slots 41, so that the opening 42 does not come to the extension of the center line of the slot 41.

These openings 42 are for releasing the stress caused by drawing processing when the first mounting concave section 20 is formed on the frame plate 19 by the drawing processing, and are formed in advance on the frame plate 19 when the frame plate 19 is still flat before performing drawing processing.

When a drawing processing is performed on a flat frame plate 19, a pulling force is exerted on some areas and a compressing force is exerted on other areas, which is inevitable, but this stress can be absorbed by a transformation of the opening 42, therefore the first mounting concave section 20 can be formed to be an accurate cylindrical shape without distortion. Also through these openings 42, the stator coils 29 can be connected to the circuit board 9.

The opening 42 may be formed up to the bottom end of the surrounding wall 20a of the first mounting concave section 20, or may be formed so that it extends through the base of the first mounting concave section 20 up to an area between the slots 41 for mounting coils.

The disk drive motor 5 is comprised of the rotor 28 where the rotor magnets 33 are secured, and the stator, including the yoke element 28f where the stator coils 29 are coiled.

Now the frame plate 19 used for the magnetic recording unit of the second embodiment will be explained with reference to FIG. 10.

The frame plate 19 is made of a non-magnetic material, stainless steel for example, and the frame 14 is molded around the frame plate 19 together with the frame plate 19 by outsert molding. The frame 14 is made of polycarbonate resin which is reinforced by mixing in glass fillers. The front end of the frame 14 has a dead space 46 for inter-fitting the connector 24.

The first opening 21 and the second opening 23 are formed at the front part of the frame plate 19. The second mounting concave section 43, having a shallow cup shape with a circular cross-section, is formed near the first opening 21 by drawing processing. Using the first opening 21 and the second mounting concave section 43, the record/playback head body 57 and the head drive motor, having the same structure as the record/playback head body 57 and the head drive motor in accordance with the first embodiment, are mounted.

A plurality of openings 48 are formed on the surrounding wall section 43a of the second mounting concave section 43 at equal intervals in the circumference direction. These openings 48 are for releasing stress caused by drawing processing when the second mounting concave section 43 is formed on the frame plate 19 by the drawing processing, and are formed in advance on the frame plate 19 when the frame plate 19 is still flat before performing drawing processing.

Now the mounting of the record/playback head 57 and the head drive motor on the frame plate 19 will be explained with reference to FIG. 11.

The head shaft 26 of the head substrate 36 is inter-fitted in the second mounting concave section 43 (FIG. 10) of the frame plate 19. The head arm 37 and the head moving coil 47 are secured on the head substrate 36.

The bottom yoke 34 is inserted in the first opening 21. The bottom yoke 34 has the same shape as the first opening 21. The head drive magnet 25 is secured on the top face of the bottom yoke 34. The top yoke 35 is mounted on the frame plate 19 so that the top yoke 35 is above the head drive magnet 25, leaving a space between the top yoke 35 and the head drive magnet 25.

The head drive motor is comprised of the top yoke 35, the bottom yoke 34, the drive head magnet 25 and the head moving coil 47. The head drive motor has the same structure as the head motor of the first embodiment, which was explained with reference to FIG. 7.

The head 37a (FIG. 13) and the head moving coil 47 at the tip of the head arm 37 are connected to the control circuit (not illustrated) of the circuit board 9 mounted at the bottom side of the frame plate 19 via the FPC (flexible printed circuit) 22. This FPC 22 passes through the second opening 23 formed on the frame plate 19.

Now the cartridge eject mechanism will be explained with reference to FIG. 11 and FIG. 13.

A main eject mechanism 7 is mounted on the top face of the frame plate 19 behind the second opening 23, and a sub-eject mechanism 8 is mounted behind the first opening 21.

If an operator pushes the rear end of the cartridge 2, which is inserted in the case body 4, forward, then the lock state of the main eject mechanism 7 is released, and the cartridge 2 is pushed back into the cartridge insertion slot 18 by the force exerted by the main eject mechanism 7 and the sub-eject mechanism 8.

Since this cartridge eject mechanism is well known, a detailed explanation is omitted. The sub-eject mechanism 8 pushes the cartridge 2 backward (toward the cartridge insertion slot 18) using the lever element 40, and since this lever element 40 remains in the dead space of the case body after the cartridge 2 is ejected, deformation of the case body 4 by an external force is prevented.

Figure 12:
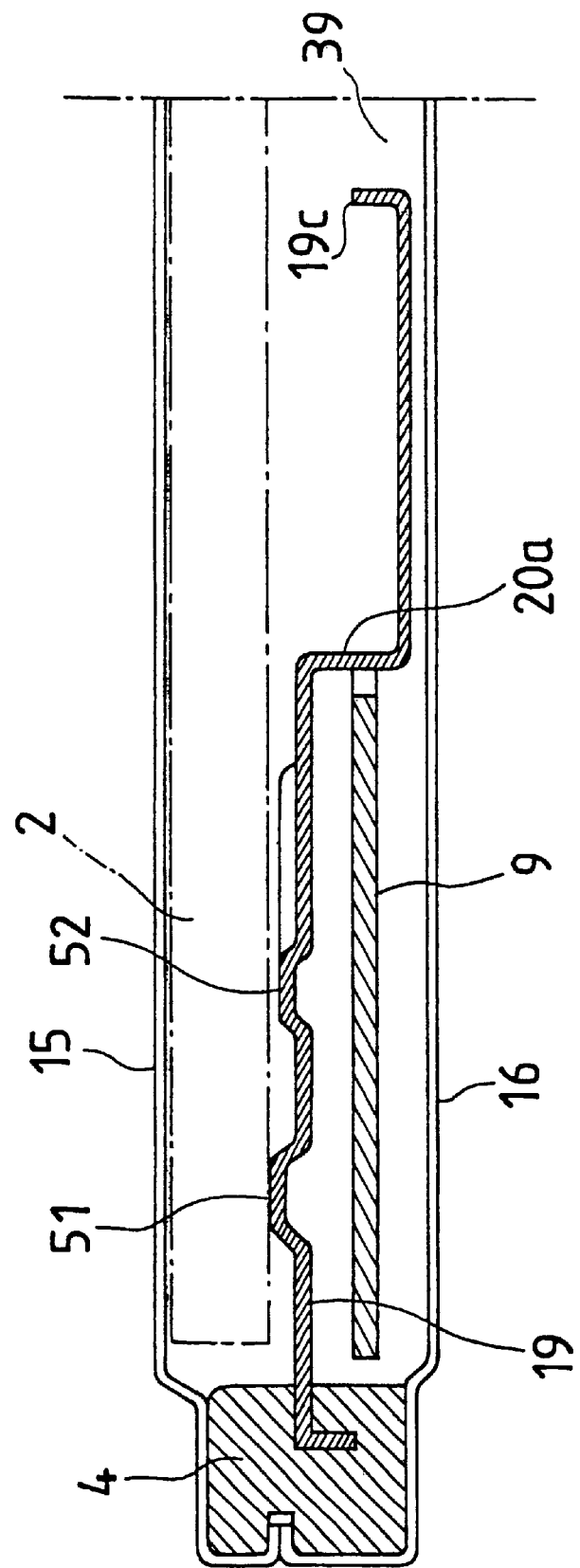
FIG. 12 is a cross-sectional view depicting the J—J cross-section in FIG. 10.

Now forming of protrusions for supporting the cartridge in the frame plate 19 will be explained with reference to FIG. 13 and FIG. 12.

A plurality of support convex sections 51 are formed around the first mounting concave section 20 of the frame plate 19. These support convex sections 51 support the bottom face of the cartridge 2 inserted in the case body 4. The cartridge 2, which is supported by the support convex sections 51 and is attracted by the disk attraction magnet 32 secured in the mounting base 31 of the rotor shaft 30, is positioned at an appropriate location in the case body 4.

Figure 13:
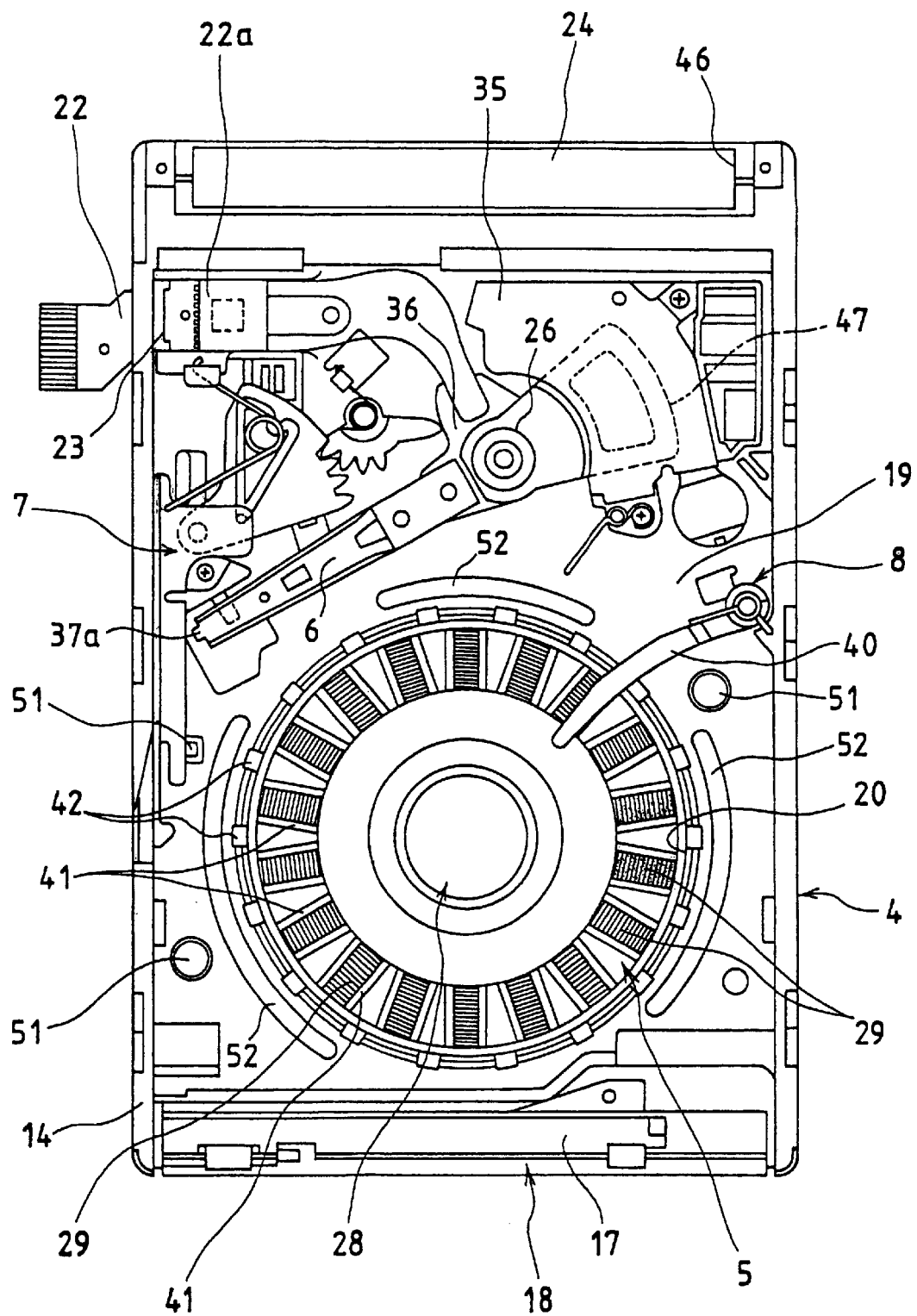
FIG. 13 is a top view depicting the magnetic recording unit of the second embodiment of the present invention where the top cover is removed.

In the example shown in FIG. 13, two support convex sections 51 are formed around the first mounting concave section 20 at locations facing each other, but if three support convex sections 51 are arranged roughly at equal intervals around the first mounting concave section 20, then the cartridge 2 is held at a stable position supported at three points.

In addition to the support convex sections 51, the second support convex sections 52 are formed around the first mounting concave section 20 at positions which are lower than the support convex sections 51. It is preferable that the first support convex sections 51 have a protruding shape and point-contact the bottom face of the cartridge 2 respectively, whereas the second support convex sections 52 are arc shaped, being concentric with the first mounting concave section 20, and line-contact the cartridge 2. The second support convex sections 52 are for preventing the cartridge 2 from contacting the rotor 28 of the disk drive motor 5, even if the case body 4, where the cartridge 2 is set, is pressed from the top or bottom face direction.

Now the case body and the elements to be housed in the case body will be explained with reference to FIG. 11.

The circuit board 9 is mounted on the bottom face of the frame plate 19 via the insulation sheet 50. In the insulation sheet 50 and the circuit board 9, the parts corresponding to the first mounting concave section 20 and the second mounting concave section 43 are notched.

At the front edge of the circuit board 9, the connector 24, conforming to PCMCIA standard, is secured. When the circuit board 9 is connected to the bottom face of the frame plate 19, this connector 24 is inter-fitted in the dead space 46 formed at the front end of the front frame 14.

The frame plate 19, where such mechanical parts as the disk drive motor 5, record/playback head boy 57, head drive motor and cartridge eject mechanisms 7 and 8 are mounted on the top face and the circuit board 9 is mounted on the bottom face, is housed in the case body 4 and constitutes the card type magnetic recording unit.

The case body 4 comprises a top and bottom covers 15 and 16 made of metal. The size of the case body 4 conforms to PCMCIA standard type II.

The cartridge 2, which is inserted from the cartridge insertion slot 18 formed at the front part of the case body 4, has an opening 12 which can be opened/closed by a shutter 2a at the front part. When the cartridge 2 is inserted in the case body 4, the shutter 2a opens and the disk 10 is exposed from the opening 12.

The lid body 17 is disposed at the position facing the cartridge insertion port 18 of the case body 4. The structure and function of the lid body 17 are the same as the lid body 17 in accordance with the first embodiment which was described with reference to FIG. 4 and FIG. 5.

What is claimed is:

1. A magnetic recording unit comprising:
   a case body where a cartridge insertion slot for inserting a cartridge housing a disk, which is a recording medium, is formed on one end;
   a frame plate mounted inside said case body where a first concave section and a second concave section are formed at different areas;
   a disk drive motor which is mounted on said frame plate using said first concave section so as to drive and rotate said disk;
   a record/playback head body for recording and playing back information to/from said disk and a head drive motor for driving said record/playback head body for said disk, which are mounted on said frame plate using said second concave section; and
   a first bent section of said frame plate about a center opening of said first concave section to mount said disk drive motor, and a second bent section of said frame plate about a center opening of said second concave section to mount said record/playback head body and said head drive motor.

2. The magnetic recording unit according to claim 1, wherein said frame plate is made of non-magnetic material.

3. The magnetic recording unit according to claim 2, wherein a head drive magnet for generating a magnetic field for said head drive motor and a head yoke element constituting a part of the magnetic path are disposed on said frame plate.

4. The magnetic recording unit according to claim 3, wherein said head yoke element further comprises a first yoke and a second yoke.

5. The magnetic recording unit according to claim 2, wherein said frame plate is made of non-magnetic stainless steel.

6. The magnetic recording unit according to claim 3, wherein a notched window section for mounting the head yoke element is formed near the second concave section of said frame plate, and said head yoke element is inserted in this notched window section.

7. The magnetic recording unit according to claim 4, wherein said head drive magnet is secured on said first yoke.

8. The magnetic recording unit according to claim 1, wherein a yoke element of a stator constituting said disk drive motor is secured to the base of or to a surrounding wall of the first concave section formed in said frame plate.

9. The magnetic recording unit according to claim 8, wherein respective slots are formed on the base of said first concave section at positions facing stator coils coiled on the respective arms of said yoke element.

10. The magnetic recording unit according to claim 9, wherein said stator coils are disposed a said slots formed on said first concave section such that the stator coils do not protrude from said first concave section.

11. The magnetic recording unit according to claim 9, wherein a plurality of openings are formed on the surrounding wall of said first concave section.

12. The magnetic recording unit according to claim 11, wherein said openings are formed at positions corresponding to positions between the slots formed at the base of said first concave section.

13. The magnetic recording unit according to claim 11, wherein said openings spread from said surrounding wall of the first concave section to the base.

14. The magnetic recording unit according to claim 1, wherein said case body has a card size conforming to PCMCIA standard.

* * * * *